United States Patent [19]

Hellström

[11] Patent Number: 4,707,949
[45] Date of Patent: Nov. 24, 1987

[54] METHOD FOR MANUFACTURING A SPECTACLE-GLASS FOR MYOPES

[75] Inventor: Lars Hellström, Mölndal, Sweden
[73] Assignee: Optimed N.V., Izegem, Belgium
[21] Appl. No.: 885,866
[22] Filed: Jul. 15, 1986
[30] Foreign Application Priority Data
  Jul. 26, 1985 [NL] Netherlands .......................... 8502142
[51] Int. Cl.⁴ ............................................... B24B 1/00
[52] U.S. Cl. ................................................. 51/284 R
[58] Field of Search ........................... 51/283 R, 284 R
[56] References Cited
  U.S. PATENT DOCUMENTS
  2,990,664  7/1961  Cepero ................................. 51/284
  3,897,657  8/1975  Smith ................................. 51/284 R
  4,640,587  2/1987  Henkel ............................... 51/284 R
  FOREIGN PATENT DOCUMENTS
  1378468 12/1974 United Kingdom .................. 51/284

Primary Examiner—Harold D. Whitehead
Attorney, Agent, or Firm—Cushman, Darby & Cushman

[57] ABSTRACT

A method for manufacturing a spectacle-glass for myopes, starting for simplicity sake from a semi-finished glass, that is a glass having on the inner side, a slight concave hollowing, which comprises computing according to the desired diopter value, the required curvature, and with torus-like grinding, the so-called cross-curvature, and computing according to the desired field of view, a second curvature, whereafter the glass is arranged in a generator and a center hollowing is milled according to the basic curvature, while thereafter the glass edge around the center hollowing is milled according to said second curvature, and the center hollowing of the thus-machined glass is finished, respectively polished, by using a tool with convex radiusing which corresponds to the basic curvature, whereafter the edge is subjected to at least one finishing operation and one polishing operation by using an implement with a convex radiusing which corresponds to said second curvature, whereby moreover use is made of a resilient intermediate part between said implement and a finishing pad, respectively polishing pad.

5 Claims, 5 Drawing Figures

METHOD FOR MANUFACTURING A SPECTACLE-GLASS FOR MYOPES

BACKGROUND OF THE INVENTION

1. Field of the Invention

This invention relates to a method for manufacturing a spectacle-glass for myopes, whereby one starts from a semi-finished glass, that is a glass which has on the inner side, a slight concave hollowing.

2. Discussion of the Prior Art

Myopes with severe eye divergences and with a requirement for high diopter values, have up to now always been helped with glasses which always have a thick edge thickness. The disadvantages thereof are clear: the glasses are unaesthetic; the frame selection is limited; the glasses are heavy and make the spectacles uselessly heavier. Moreover these conditions influence the field of view due to forming disturbing concentric circles resulting from the light refraction in the glasses.

It has already been proposed to lower the glass edge thickness. In spite of the techniques being used, the edge thickness lowering had a detrimental action on the field of view or on the aesthetic appearance.

Such an example lies in the technique as described in the Swiss Pat. No. 634,928 in the name of W. Wrobel, whereby there may be obtained but a field of view which is markedly narrower than the optimum field of view required in relation with the diopter value.

A search was also made for solutions which optimize the field of view as well as they satisfy the requirements from the aesthetic point of view. Belgian Pat. No. 899,955 filed on June 19, 1984 in the name of the Applicant, comprises an attempt in such a direction. According to said Patent, the optimum field of view is obtained or retained with a marked lowering from 40 to 51% of the edge thickness and a convex finishing of the transition between the center concave hollowing of the spectacle-glass and the flat milled edge.

There was obtained hereby the object of an optimum field of view together with still a substantial improvement from the aesthetic point of view, that is an already strongly lowered edge thickness and avoiding the aesthetically-disturbing bull's eye effect.

The accent fell thereby on the first object. Not all the aesthetic requirements could be satisfied.

The glasses still showed some disturbing edge thickness, while the eye of the spectacle wearer in the field of view was perceived as reduced by the person standing directly facing the spectacle wearer.

Moreover the convexly-rounded transition between the flat edge and the concavely-hollowed center portion still remained too abrupt, which still had for the user a disturbing effect, as the usable field of view merged substantially without transition with the glass edge. Said transition and edge did remain an obstacle for the spectacle wearer.

The technique used according to said Patent did not moreover allow any inner torus-like grinding, which often made arranging the glasses in the frame difficult and was detrimental to the final aesthetic appearance of the spectacle.

Now all the myopes do not have the same need and do not bring the same requirements for an optimum field of view. Some myopes choose a more aesthetic spectacle glass, even then with some loss of field of view, while some other myopes still have no requirement regarding that field of view which is being considered as optimum for the normal myope. Every user of a spectacle-glass wants however as much as possible to have the disturbing refraction effect between field of view and edge be reduced.

SUMMARY OF THE INVENTION

The invention has now for an object to obviate such drawbacks and other ones from a normal spectacle-glass for myopes with high diopter value, and to provide a method wherewith it is possible to offer to the myopes a number of alternatives unobtainable up to now, that is glasses with optimum aesthetic qualities and retaining a field of view which is adapted to the individual expectations and living conditions of every person.

For this purpose, the method according to the invention has for characteristic that in accordance with the desired diopter value, the required curvature, and with torus-like grinding, the so-called cross-curvature is computed, and according to the desired field of view, a second curvature is computed, whereafter the glass is arranged in a generator and a center hollowing is milled according to the basic curvature, while thereafter the glass edge around the center hollowing is milled according to said second curvature, and the center hollowing of the thus-treated glass is finished, respectively polished, by using a tool with convex radiusing which corresponds to the basic curvature, whereafter the edge is subjected to at least one finishing operation and one polishing operation by using an implement with a convex radiusing which corresponds to said second curvature, whereby moreover use is made of a resilient intermediate part between said implement and a finishing, respectively polishing pad.

According to the invention, use may be made for the resilient intermediate part, of a material with a resiliency which is enough to finish the edge about the center bore.

An advantageous embodiment of the method according to the invention lies in using for the intermediate part, a material which is water-impermeable at least on that side which will engage the finishing or polishing pad.

To obtain the desired result with a minimum number of operations, a pressure may be exerted on the intermediate part which is high enough to finish convexly the edge about the center hollowing and the transition between the center hollowing and the edge.

Other details and advantages of the invention will stand out from the following description, given by way of non limitative example and with reference to the accompanying drawings, in which:

FIG. 4 is a cross-section through a glass with a center hollowing giving the desired diopter value, together with an implement with a convex cross-section according to curvature B, and a resilient-material intermediate part, and a finishing or polishing pad.

DETAILED DESCRIPTION OF THE DRAWINGS

The method which is shown by the various figures, comprises a series steps which lead with a minimum number of operations, to a spectacle-glass with very divergent properties, mainly characterized by a substantial improvement in the aesthetic appearance.

In the first step, for simplicity sake, one starts with a semi-finished glass 1 from synthetic or mineral material. Such a semi-finished basic product is slightly hollowed on the inner side. It would naturally also be possible to start with a raw glass, but then a semi-finished glass would first have to be ground therefrom.

Depending on the desired diopter value, the basis curvature A is computed. With torus-like grinding, the so-called cross-curvature is also computed.

Independently from the diopter computing, the field of view wherewith the curvature B corresponds, is further also computed.

Figure 1:
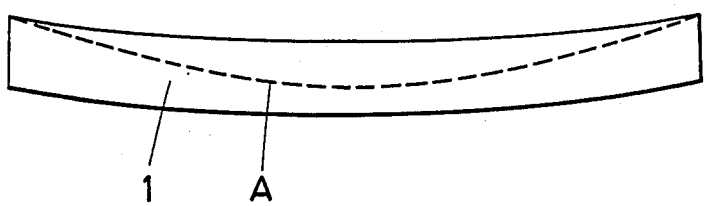
Figure 2:
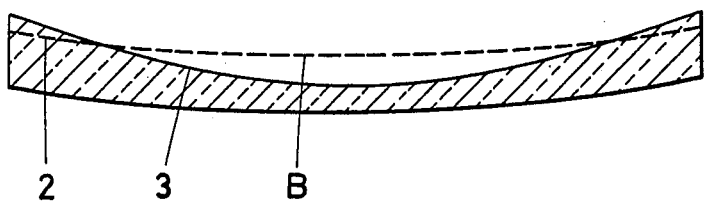
FIG. 2 is a cross-section through a glass with a center hollowing according to curvature A, and shown in dotted line, the curvature B wherefrom the desired field of view is obtained.

In the usual way, the glass to be machined is secured in a generator. The hollowing which corresponds to curvature A, is then milled out. Directly thereafter, the glass edge is milled along curvature B. Due to the larger curvature radius, but the margin portion 2 is then machined. There is thus formed what may be considered as the center hollowing 3, the curvature radius of which is determined by the required diopter value. The center middle portion or the center hollowing 3 is thus not involved by the machining according to FIG. 2.

Figure 3:
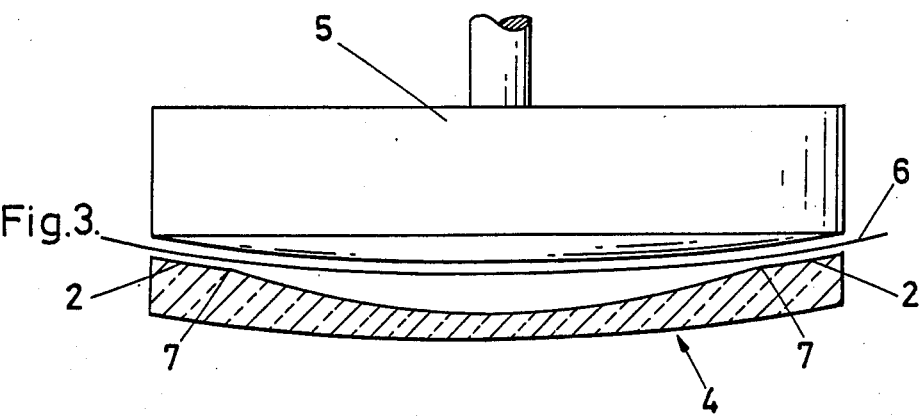
FIG. 3 is a cross-section through a glass as shown in FIG. 2, after treatment, with opposite thereto an implement and a finishing pad for the machining of the glass center hollowing.
Figure 4:
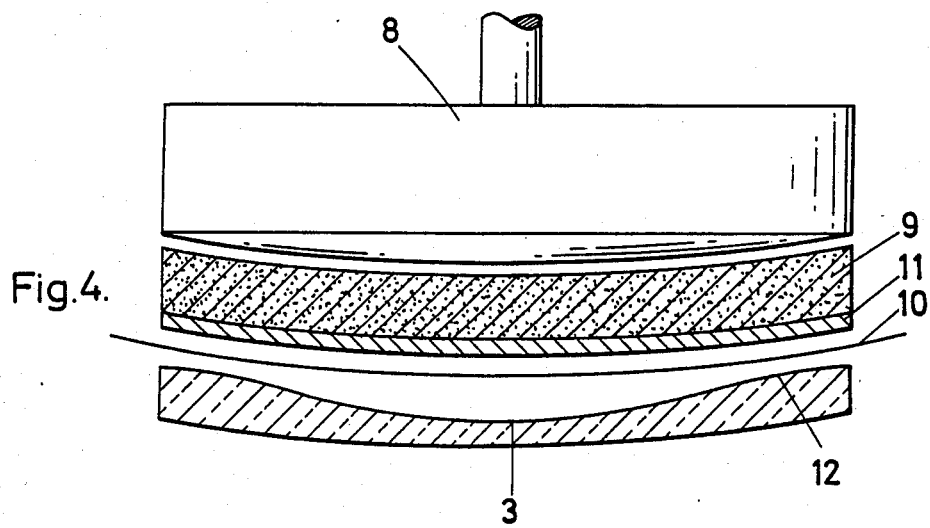
FIG. 4 is a cross-section through a semi-finished glass which is used as starting material, whereby a dotted line shows the curvature A for the desired diopter value.

After said operations, there is thus obtained a glass the cross-section of which appears in FIG. 3. The glass with the cross-section according to said FIG. 3, bears the general reference numeral 4. In a further stage, use is then made of an implement or head 5 with a convexity which complies with the hollowing 3 of glass 4. The center hollowing 3 is machined with a coarse-grain finishing pad 6 and directly thereafter with a finer-grain finishing pad (not shown).

Figure 5:
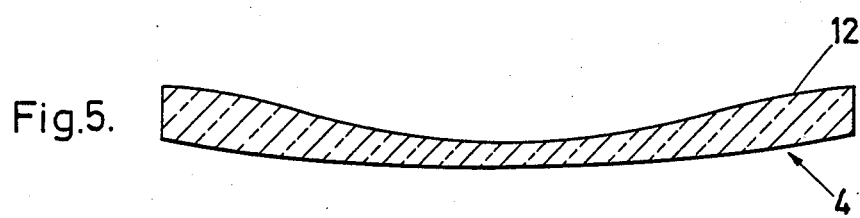
FIG. 5 is a cross-section through a finished glass according to the invention.

Now to remove the sharp circular edge 7 and to obtain the final product, which fulfills all the aesthetic criterions, use is now made of an implement or head 8 with a convexity which complies with the curvature B of convex edge 2 from glass 4. On said head 8 an intermediate part 9 from resilient material is secured, at least that side thereof facing finishing pad 10 is water-impermeable. Said portion of intermediate part 9 is shown with reference numeral 11. By exerting enough pressure on intermediate part 9, thus also on finishing pad 10, there is machined not only the concave-rising margin portion 2, but also said sharp circular edge 7. That pressure which is exerted by head 8 on intermediate part 9 and the resiliency of the material said intermediate part 9 is made of, are so selected as to have the angle between margin portion 2 and center hollowing 3 be finished convexly, as it is clear from FIG. 5. Said convex transition area is shown in 12 in FIG. 5.

The center hollowing may then be polished in the conventional way by making use of a polishing pad on head 5.

During the following stage, again by making use of an intermediate part 9 secured on head 8, and of a suitable polishing pad, the margin area 2 and the convex radiusing 12 are polished.

With said various operations, there is formed between the margin area 2 and convex hollowing 3, a very gradual smooth transition, while the glass edge thickness may be more or less reduced depending on the selection of the visual field.

It appears clearly from the above-described method, that the edge thickness of the thus-machined glass may be markedly reduced, but mostly that the gradual transition between the margin area and the center hollowing, which determines the field of view, does not only satisfy the desired aesthetic criterions, but also does not result in any disturbing effect for the glass wearer.

There is also given the possibility to let the field of view vary depending on the requirement of each patient, always with a marked improvement in the aesthetics of the glass. When the glasses have to be ground inner torus-like, this may also be made without disturbing the working of the method according to the invention.

The possibilities given with the invention will appear from the tables in the following pages.

TABLE 1

| | Spectacle-glasses with 65 mm $\phi$ | | | | | | |
| Diopter/Sf. | Field of view in mm. | | | | | | |
| | $\phi$ 54 | $\phi$ 50 | $\phi$ 46 | $\phi$ 42 | $\phi$ 38 | $\phi$ 34 | $\phi$ 30 |
|---|---|---|---|---|---|---|---|
| −3 | 4 | 3.8 | 3.5 | 3.2 | 3.1 | 2.7 | 2.1 |
| −4 | 5 | 4.7 | 4.5 | 4 | 3.4 | 3.2 | 3 |
| −5 | 6.5 | 6 | 5.5 | 4.5 | 4 | 3.6 | 3.2 |
| −6 | 7.5 | 7 | 6.5 | 6 | 5.5 | 4.5 | 3.7 |
| −7 | 8 | 7.5 | 7 | 6.5 | 6 | 5 | 4 |
| −8 | 9 | 8.5 | 7.5 | 7 | 6.5 | 6 | 5 |
| −9 | 10 | 9.5 | 9 | 7.5 | 7 | 6.5 | 5.5 |
| −10 | 11 | 10.5 | 9.5 | 9 | 8 | 7.5 | 6.5 |
| −11 | 12.5 | 11.5 | 10 | 9.5 | 8.5 | 8 | 7 |
| −12 | 13.5 | 12.5 | 11.5 | 10 | 9 | 8.5 | 7.5 |
| −13 | 14 | 13 | 11 | 10.5 | 9.5 | 9 | 8 |
| −14 | 14.5 | 14 | 12 | 11 | 10 | 9.5 | 8.5 |
| −15 | — | 15 | 14 | 12.5 | 11 | 10 | 9 |
| −16 | — | 16.5 | 15 | 14 | 11.5 | 10.5 | 9.5 |
| −17 | — | — | 15.5 | 14.5 | 12 | 11 | 10 |
| −18 | — | — | 16 | 15 | 13 | 11.5 | 11 |
| −19 | — | — | 16.5 | 16 | 13.5 | 12.5 | 12 |
| −20 | — | — | — | 16.5 | 14 | 13 | 12.5 |
| −21 | — | — | — | — | 15.5 | 12 | 11 |

TABLE 2

| | Spectacle-glasses with 70 mm $\phi$ | | | | | | |
| Diopter/Sf. | Field of view in mm. | | | | | | |
| | $\phi$ 54 | $\phi$ 50 | $\phi$ 46 | $\phi$ 42 | $\phi$ 38 | $\phi$ 34 | $\phi$ 30 |
|---|---|---|---|---|---|---|---|
| −3 | 4.5 | 4.2 | 3.9 | 3.5 | 3 | 2.5 | 2 |
| −4 | 5.5 | 5 | 4.5 | 4 | 3.5 | 3 | 2.5 |
| −5 | 6.5 | 5.5 | 5 | 4.5 | 4 | 3.5 | 3 |
| −6 | 7.5 | 7 | 6.5 | 5.5 | 5 | 4.5 | 4 |
| −7 | 8.5 | 8 | 7 | 6.5 | 6 | 5 | 4.5 |
| −8 | 10 | 9 | 8.5 | 8 | 7.5 | 6.5 | 6 |
| −9 | 11 | 10 | 9 | 8.5 | 8 | 7 | 6.5 |

TABLE 3

| | Spectacle-glasses with 75 mm $\phi$ | | | | | | |
| Diopter/Sf. | Field of view in mm. | | | | | | |
| | $\phi$ 54 | $\phi$ 50 | $\phi$ 46 | $\phi$ 42 | $\phi$ 38 | $\phi$ 34 | $\phi$ 30 |
|---|---|---|---|---|---|---|---|
| −3 | 5 | 4.5 | 4 | 3.5 | 3 | 2.5 | 2 |
| −4 | 6 | 5 | 4.5 | 4 | 3.5 | 3 | 2.5 |
| −5 | 7.5 | 6.5 | 6 | 5 | 4.5 | 4 | 3 |
| −6 | 8 | 7.5 | 6.5 | 6 | 5.5 | 4.5 | 4 |
| −7 | 8.5 | 8 | 7.5 | 6.5 | 6 | 5 | 4.5 |

I claim:

1. A method for manufacturing a spectacle-glass for myopes, starting from a semi-finished glass having on the inner side a slight concave center hollowing, which comprises:

a. computing according to the desired diopter value, the required basic curvature;
b. computing according to the desired field of view, a second curvature for the spectacle lens;
c. arranging the spectacle-glass in a generator, and center hollow milling the spectacle-glass according to the basic curvature;
d. thereafter milling the glass edge of the spectacle-glass around the center hollowing according to said second curvature;
e. finishing and polishing the center hollowing of the thus-treated spectacle-glass by using a tool with convex radiusing which corresponds to the basic curvature;
f. thereafter subjecting the edge of the spectacle-glass around the center hollowing to at least one finishing operation and one polishing operation by using an implement with a convex radiusing which corresponds to said second curvature, and by using a resilient intermediate part between said implement and a finishing polishing pad while transmitting pressure from the implement to the finishing polishing pad through the resilient intermediate part to allow the resilient intermediate part to follow the curves of the glass during finishing and polishing.

2. A method as defined in claim 1, particularly for torus-like grinding, further comprising computing for torus-like grinding the cross curvature of the spectacle-glass, and also center hollow milling the spectacle glass with the generator according to said cross curvature for torus-like grinding.

3. A method as defined in claim 1, which further comprises using for said resilient intermediate part a material with a sufficiently great resiliency to finish the edge about the center hollowing, or respectively polish the edge about the center hollowing.

4. A method as defined in claim 1, which further comprises using as said intermediate part a material which is water-impermeable, at least on that side which engages the finishing or polishing pad.

5. A method as defined in claim 1, which further comprises exerting a pressure on said intermediate part sufficiently high to finish convexly the edge about the center hollowing and the transition between said center hollowing and the edge about the center hollowing.

* * * * *